United States Patent [19]

Tiefenthaler et al.

[11] 4,320,226

[45] Mar. 16, 1982

[54] WATER SOLUBLE GUAR PRODUCT AND METHOD FOR MAKING IT

[75] Inventors: Karl H. O. Tiefenthaler; Ulrich Wyss, both of Kreuzlingen, Switzerland

[73] Assignee: Meyhall Chemical A.G., Kreuzlingen, Switzerland

[21] Appl. No.: 195,583

[22] Filed: Oct. 9, 1980

[30] Foreign Application Priority Data

Dec. 3, 1979 [CH] Switzerland ............... 10719/79

[51] Int. Cl.³ ............................................. C08B 37/00
[52] U.S. Cl. .................................... 536/114; 536/115; 536/117
[58] Field of Search ................ 536/114, 117, 115

[56] References Cited

U.S. PATENT DOCUMENTS

| | | | |
|---|---|---|---|
| 2,575,352 | 11/1951 | Lohmar | 260/233.5 |
| 2,801,242 | 7/1957 | Kerr et al. | 260/233.5 |
| 2,824,870 | 2/1958 | Neukom | 260/233.5 |
| 2,865,762 | 12/1958 | Neukom | 99/139 |
| 2,884,412 | 4/1959 | Neukom | 260/233.5 |
| 2,884,413 | 4/1959 | Kerr et al. | 260/233.5 |
| 2,938,901 | 5/1960 | Kerr et al. | 260/233.5 |
| 2,961,440 | 11/1960 | Kerr et al. | 260/233.5 |
| 2,971,954 | 2/1961 | Kodras | 260/233.5 |
| 3,284,443 | 11/1966 | Hay et al. | 260/233.5 |
| 3,467,647 | 9/1969 | Benninga | 260/209 |
| 4,112,220 | 9/1978 | Carroll et al. | 536/18 |
| 4,129,722 | 12/1978 | Iovine et al. | 536/114 |
| 4,162,925 | 7/1979 | Tiefenthaler et al. | 106/208 |

OTHER PUBLICATIONS

Encyclopedia of Polymer Science and Technology, vol. 12, p. 835–836.
Encyclopedia of Polymer Science and Technology, vol. 10, p. 135.

*Primary Examiner*—Blondel Hazel
*Attorney, Agent, or Firm*—Herbert P. Price; T. J. Morgan

[57] ABSTRACT

A water-soluble guar product is obtained by reacting guar gum with an aqueous phosphate solution and oxidizing the product in the presence of alkali. These two process stages can also be combined into a one-stage process. The desired product is also obtained by reaction of an already partially depolymerized guar gum with aqueous phosphate solution. The product whose viscosity in aqueous solution can be set very accurately is used as thickening agent, particularly in the paper industry.

7 Claims, No Drawings

WATER SOLUBLE GUAR PRODUCT AND METHOD FOR MAKING IT

Guar gum is the ground endosperm of the seed of the guar plant that is native to India and Pakistan. Guar gum contains, as the main ingredient, a cold water soluble polysaccharide plus small amounts of vegetable proteins, cell components, inorganic salts and other impurities. The cold water soluble polysaccharide is made up of D-mannose and D-galactose in such a way that the α-1,4-glycosidically linked mannose units form long chains in pyranose form to which the galactose units in pyranose form are joined individually and α-1,6-glycosidically with every second mannose group. This polysaccharide, which is called a galactomannan, forms highly viscous solutions in water at low concentrations. Thus, 1 percent solutions of industrially produced guar gum in water exhibit viscosities of about 3000 to 6000 milli-Pascal-second (mPa.s), as measured with a Brookfield or similar viscosimeter.

Large quantities of guar gum are used as such, or as chemically and/or physically modified, in diversified branches of industry, i.e., in the textile industry as thickening agents for paste prints, in the paper industry as aids for increasing the mechanical paper firmness, in the explosive industry as a water blocking agent, in the oil well drilling industry as thickening agents in well fracturing fluids and in drilling muds, in the food industry as stabilizers in ice cream manufacture, and the like.

Examples of chemically modified guars are carboxymethylated, alkylated and hydroxyalkylated galactomannans. Other guar derivatives are quaternary ammonium ethers as well as oxidatively or hydrolytically depolymerized guar products.

A further possibility for modifying guar gum is the reaction with phosphates. In contrast to starch which under certain reaction conditions is converted with phosphates to water-soluble starch-phosphate esters, guar gum will under the same or similar reaction conditions give products which even at a relatively low substitution degree are completely insoluble in water. Such guar-phosphate esters that do not swell even in hot water are, naturally, no longer suited for use as thickening agents.

It is the object of the present invention to provide water-soluble, phosphoric acid-modified guar products.

Such products are very well suited as thickening agents for the applications mentioned above, and provide a means for obtaining desired viscosities in aqueous solutions.

With the new products, results can be achieved in certain fields of use which cannot be achieved as a rule to the same degree with untreated guar gums or with those modified in the usual manner. This is particularly true in the case where, e.g., good film forming properties, strong anionity, gel forming ability with multivalent cations, stability of the solutions, good filterability, etc., are required.

Thus, such phosphated guar products are excellently suited, for example, for the surface treatment of those papers where it is of importance to achieve a closed surface to the greatest extent possible, e.g., in order to lower the porosity of the papers, increase the solvent resistance or improve their printability. In many cases, clearly better results can be achieved than with the products ordinarily used for these purposes such as alginates, carboxymethyl celluloses or carboxymethylated galactomannans.

The new products are likewise suited for use as paint additives. An improved water retention ability assures a trouble-free processability. Both the compatibility and affinity to the customarily used optical brighteners are excellent.

By reason of the strongly anionic character and natural affinity of the guar to cellulose, the new phosphated guar products give good results also as additives in paper production. In particular, when the guar products are combined with alum, sheet formation, filler retention and dehydration are favorably affected as well as the mechanical strength of the paper.

U.S. Pat. No. 3,467,647 describes polysaccharides which contain both cationic and anionic substituents and have protein-like properties. As polysaccharides, starch, carob bean gum and guar gum are mentioned, and as anionic substituents, phosphate esters are mentioned among others. The guar product mentioned in the example is not described as water soluble and has a very low substitution degree (DS-0.05). The thus described quaternary ammonium ether-phosphate ester modified guar is used as an internal sizing agent for paper.

U.S. Pat. No. 4,162,925 describes phosphate esters of locust bean gum having a degree of substitution of about 0.03 to about 0.5. Such esters are soluble in cold water whereas locust bean gum when underivatized has limited solubility in cold water. Guar gum on the other hand is soluble in cold water but when phosphated becomes insoluble.

The phosphated guar gums of this invention are the esters of phosphoric acid and guar gum. From all indications these esters are the monoesters of phosphoric acid. The phosphated guar gums have a degree of substitution of about 0.1 to about 0.5, preferably 0.1 to about 0.2, and a viscosity (2 weight percent in water) of about 50 to about 4,000 mPa.s. (Brookfield RVT, spindle 2, 20 RPM, 25° C.)

The present invention further comprises the method for making water-soluble, phosphate-modified guar gum.

By the process of this invention, guar gum is reacted with a phosphate at elevated temperatures followed by treating the resulting phosphate ester with an oxidizing agent under alkaline conditions. In carrying out this process, generally a commercial "high grade" guar gum is used, i.e., a guar gum, a weight percent aqueous solution of which has a viscosity of about 5000 mPa.s. (Brookfield RVT, spindle 2, 20 RPM, 25° C.). However, the viscosity and purity of the gum are not of a decisive importance for the reaction.

In a modification of the process, the guar gum can be phosphated directly in the presence of an oxidant in an alkaline medium.

In a further modification of the process, depolymerized guar can be phosphated by reaction with a phosphate at elevated temperatures.

In even a further modification, guar gum is reacted with a phosphate at elevated temperatures followed by heating under alkaline or acid conditions to render the product water soluble.

The phosphate can be added as an aqueous solution or can be added separately as a lye solution and as phosphoric acid. If the lye solution and acid are added separately, a preceding heating of the guar gum with the lye solution will digest the gum so that the end product when dissolved in water will provide solutions of improved clarity.

Suitable phosphates are the salts that are stable in aqueous solutions up to 180° C., particularly the alkali salts of various phosphoric acids, preferably orthophosphoric acid. If acid and lye solution are added separately, orthophosphoric acid is again the preferred acid. Suitable lye solutions are the alkali metal hydroxides, e.g., sodium hydroxide, potassium hydroxide and lithium hydroxide.

Addition of phosphate solution is effected by injection or by dropwise addition into the guar gum, which can previously be mixed with methanol to prevent clumping. At least about 20 parts by weight of the organic liquid are used per 100 parts by weight of the gum and, preferably, about 40 parts. There is no upper limit to the amount of methanol. However, to keep the reactor size within practical limits and to reduce the amount of liquid which must be recovered, this upper limit will be about 100 parts by weight per 100 parts by weight of the guar gum.

The pH value of the phosphate solution lies generally between about 4.5 and 8.0, and preferably between about 5 and 6. If the lye solution and phosphoric acid are added separately, the amounts calculated for the required pH value are used. Typical ratios of sodium hydroxide to phosphoric acid are about 1:1.5 to about 1:2.2 on weight basis. When other alkali metal hydroxides are used, the equivalent useful ranges can be readily calculated by those skilled in the art. When sodium hydroxide and phosphoric acid are used as the phosphatizing agent, then to 100 parts by weight of guar gum are reacted 5 to 15 parts by weight of sodium hydroxide and 7.5 to 33 parts by weight of phosphoric acid. A particularly preferred specific proportion of reactants is 8 parts by weight of phosphoric acid and 4.15 parts by weight of sodium hydroxide per 40 parts by weight of guar gum.

In conducting the phosphatizing reaction of this invention, water must be present. The amount of water will vary from about 20 parts to about 100 parts by weight per 100 parts by weight of guar gum. This amount of water is the total amount of water mixed with the guar gum which includes the water in the phosphatizing solution. This amount of water should be enough to homogeneously mix well with the gum, but should not be used in such amounts that excessive hydration and solubilization of the gum occurs.

The pH value of the phosphate solution affects the speed of reaction. The lower the pH value, the faster the esterification. On the other hand, a low pH value adversely affects the color and viscosity of the product. Undesirable caramelization and hydrolysis reactions increase naturally with a decreasing pH value.

In carrying out the phosphating reaction, the phosphate-guar gum mixture can be treated directly, without intermediate drying, or after drying to a water content below 10%, in an oven to the desired reaction temperature. The reaction temperature should be above 130° C., since below this temperature phosphation is too slow; above 180° C., however, undesirable side reactions such as caramelization, greatly increase. As a rule, a temperature of about 160° C. is employed.

The time of reaction is mainly a function of the pH value of the phosphate solution, the phosphate-guar gum ratio, the reaction temperature and the degree of substitution desired. It is generally 1 to 2 hours, but in certain cases can be up to 3 hours or more.

After the guar gum-phosphate mixture has been heated for the desired period of time, the mixture is taken from the oven; it is allowed to cool down, preferably introduced into a kneader and mixed with an aqueous solution of lye and an oxidizing agent, e.g., hydrogen peroxide, the amount of lye solution being a function of the phosphoric acid-lye ratio used, among other things. The amount of oxidant is largely a function of the degree of substitution of the product.

Suitable oxidizing agents are, for example, hydrogen peroxide, sodium persulfate, atmospheric oxygen and the like. Generally, the amount of oxidizing agent, e.g., hydrogen peroxide, 30% aqueous, will be about 0.25 to about 5 mls. per 100 gms. of guar gum. The amount of lye, e.g., sodium hydroxide will be about 5 to about 30 gms. and preferably 10 to 20 gms. When atmospheric oxygen is used as the oxidizing agent, heating in the presence of oxygen is continued until the phosphated guar gum has a viscosity (2 weight percent solution in water) of about 50 to about 500 mPa.s. is obtained. The amount of water used is the same as disclosed for the phosphation stage.

The mixture is preferably heated to about 70° to 90° C. The heating time will be a function of the temperature and degree of cross linkage of the product and is generally between 10 and 60 minutes. The resulting moist, alkaline product can be neutralized after cooling with the calculated amount of acid, dried and ground. It is completely cold water soluble.

According to a preferred embodiment of the above method, a water soluble phosphated guar product is obtained by phosphating the guar gum directly in the presence of an oxidant in alkaline medium. Suitable phosphoric acids, phosphates, lyes and oxidizing agents are those described above. The quantitative ratios of reactants are the same as those described above. Products are obtained which with an increasing substitution degree give increasing viscosities when dissolving in water, the viscosity of the starting material being, however, generally unreached.

The same considerations as described above for the first stage of the first method apply to the pH value of the phosphate solution, heating temperature and heating time.

The dry product obtained from the reaction mixture according to this one-stage method is likewise soluble in cold water. The viscosity of an aqueous solution of this product will substantially depend on the heating period and/or the degree of substitution, a maximum being passed through.

The desired water-soluble phosphated guar product is obtained also without oxidation according to a further method according to the invention if, instead of an unmodified guar gum, a depolymerized guar gum is reacted with a phosphate or with phorphoric acid and lye solution with heating. A useful depolymerized guar gum has a viscosity (3 weight percent aqueous solution of about 100 to about 3000 mPa.s.). Here too products are obtained which give increasing viscosities in aqueous solution with increasing substitution degrees. The viscosity of such a solution is higher than that of the solution of the water-soluble starting product.

Partially industrially depolymerized guar gum as obtainable in the trade can be used for this method. A 3%-solution of this product in water shows, for example, a viscosity of ca. 1000 mPa.s. (measured with Brookfield RVT, 20 RPM, 25° C.). The depolymerization degree of the starting material can be varied in the known per se manner, in accordance with the viscosity requirements for the end product. The same considerations as described above for the first stage of the first method apply to the reaction parameters of this method. As in the above described one-stage method, the viscosity of the end product in aqueous solution passes further through a maximum that is dependent on the period of heating.

In a further modification of the above described process, water insoluble phosphated guar can be rendered water soluble by heating in an alkaline medium, pH about 8 to about 12 or, in an acid medium, pH about 2 to about 5 at a temperature of about 70° C. to about 90° C. for about 10 to about 60 minutes.

The following examples describe the invention in detail. Parts and percentages, unless otherwise designated, are parts and percentages by weight.

EXAMPLE 1

200 g. "high grade" guar gum powder (marketed for example by Meyhall Chemical A.G.), (viscosity of a 1%-aqueous solution about 5000 mPa.s.) are mixed with 80 ml. methanol in a one liter laboratory-type kneader. A solution of caustic soda (20.7 g.) and 85%-phosphoric acid (42.5 g) in 125 ml. water is then slowly added into the methanol-treated gum under constant mixing. After completion of the addition, the mixing is continued for another 10 minutes so as to assume a thorough mixing of the ingredients.

Following that, the guar gum-phosphate mixture is dried in a drying chamber at about 85° C. up to a water content below 5%. The dried product is heated in an oven to 160° C. for a period of 110 minutes, then removed and allowed to cool. The reaction product (substitution degrees $DS_{PO_4} \sim 0.17$) is insoluble both in cold and in hot water.

A solution of 22 g. caustic soda and 0.5 ml. hydrogen peroxide (30%) in 150 ml. water is added dropwise in a laboratory-type kneader to 160 g. of this product. After completion of the dropwise addition, the kneader is closed and heated. The mixture is heated to about 75° C. After 20 minutes, the lid is removed and the open vessel cooled. The strongly alkaline mixture is neutralized by dropwise addition of 20 g. of a solution of acetic acid (concentrated) in 30 ml. MeOH.

The product is then dried to about 10% water in a drying chamber at 85° C. and ground.

The so obtained, slightly creme-colored product quickly dissolves in cold water. The viscosity of a 2%-solution is about 300 mPa.s. (measured with Brookfield RVT, spindle 2, 20 RPM, 25° C.). The solution can be gelled by addition of small amounts of polyvalent ions, such as $Ca^{++}$ or $Al^{+++}$. Larger amounts of these ions will flocculate the strongly anionic guar gum-phosphate ester.

The product has an ash content of 23%. After washing out the salts and non-attached phosphates, a phosphate analysis gives 9.0% attached $PO_4$. This corresponds to a substitution degree of 0.18.

EXAMPLE 2

200 g. "high grade" guar gum (viscosity of a 1%-aqueous solution about 5000 mPa.s.) are dropwise mixed in a one-liter laboratory-type kneader with a solution of 20.7 g. caustic soda in 125 ml. water.

After completion of the addition, the kneader is closed and is heated to 70° C. The temperature is kept at this temperature for 30 minutes. After the mixture has cooled to room temperature, a mixture of 42.5 g. phosphoric acid (85%) and 75 ml. MeOH is dropwise added thereto.

The homogeneous mixture is heated in an oven at 160° C. for a period of 120 minutes. It is then allowed to cool down to room temperature. Following that, the reaction product is subjected to the same oxidation process as described in Example 1, dried and ground. The product is soluble in both cold and warm water.

EXAMPLE 3

200 g. "high grade" guar gum (viscosity of a 1%-aqueous solution about 5000 mPa.s) are mixed in an one liter-laboratory-size kneader with 80 ml. methanol. A solution of 20.7 g. caustic soda, 45 g. phosphoric acid (85%) and 3 ml. hydrogen peroxide (30%) in 125 ml. water is allowed to fall in drops into this mixture. After thorough mixture, the product is heated in a thin layer for 2 hours at a temperature of 160° C.

The strongly anionic guar-phosphoric ester with a DS of about 0.15 readily swells in cold water to a viscous solution (viscosity of a 2%-aqueous solution about 3000 mPa.s).

EXAMPLE 4

200 g. depolymerized guar gum (commercial product by, e.g., Meyhall Chemical A.G.), (viscosity of a 3%-solution about 1000 mPa.s) are mixed in a laboratory-size kneader with 80 ml. methanol. A solution of 20.7 g. caustic soda and 45 g. phosphoric acid (85%) in 125 ml. water is allowed to drop into this mixture. After thorough mixing, the product is heated for 2 hours at a temperature of 160° C.

After cooling, the product is ground on a laboratory-size mill. The strongly anionic product (DS about 0.5) readily swells in cold water to a highly viscous solution (viscosity of a 3%-solution about 3000 mPa.s), measured with a Brookfield-RVT viscosimeter at 20 RPM).

EXAMPLE 5

Various papers were treated in a laboratory-size press with a 2%-solution of a phosphated guar product produced in accordance with Example 1. Compared with them were papers that had been treated in the same manner with 2%-solutions of conventional surface products. The comparison was made as to porosity, toluene resistance and grease resistance. The obtained results are given in Tables I through III and show the superiority of the product according to the invention.

Products:

1 = phosphated guar product according to Example 1
2 = alginate A (commercial product)
3 = alginate B (commercial product)
4 = carboxymethyl cellulose (commercial product)
5 = carboxymethyl-modified galactomannan (commercial product of Meyhall Chemical A.G.)

TABLE I

| | Porosity (measured according to TAPPI/STANDARDS T 460 os - 66) | | | | | |
|---|---|---|---|---|---|---|
| Paper | untreated (*) | 1 (*) | 2 (*) | 3 (*) | 4 (*) | 5 (*) |
| Coating base paper 1 | 70 | 680 | 250 | 150 | 135 | 300 |
| Coating base paper | 40 | 260 | 245 | 155 | 92 | 160 |
| Silicone base paper | 54 | 630 | 265 | 155 | 110 | 275 |
| Transfer paper | 24 | 240 | 130 | 72 | 42 | 190 |
| Covering base paper | 220 | 6000 | 1700 | 690 | 390 | 1900 |

TABLE I-continued

Porosity
(measured according to TAPPI/STANDARDS T 460 os - 66)

| Paper | untreated (*) | 1 (*) | 2 (*) | 3 (*) | 4 (*) | 5 (*) |
|---|---|---|---|---|---|---|
| Offset paper | 70 | 280 | 200 | 190 | 80 | 135 |

(*) = sec/100 ml air

TABLE II (Toluene resistance (beatoff time))

| Paper | 1 (*) | 2 (*) | 3 (*) | 4 (*) | 5 (*) |
|---|---|---|---|---|---|
| Coating base paper 1 | 73 | 45 | 36 | 35 | 55 |
| Coating base paper 2 | 220 | 285 | 190 | 140 | 175 |
| Silicone base paper | 200 | 120 | 83 | 35 | 135 |
| Transfer paper | 340 | 155 | 140 | 55 | 280 |
| Covering base paper | 80 | 43 | 30 | 27 | 65 |
| Offset paper | 110 | 80 | 45 | 28 | 60 |

(*): Increase of beatoff time over untreated paper in percent

TABLE III

Grease resistance
(measured according to TAPPI-STANDARDS T 454 ts-66)

| Paper | FKW | FKW + CMC | FKW + PO$_4$-guar (Example 1) |
|---|---|---|---|
| Offset paper | 15" | 20" | 45" |
| Silicone base paper | 30" | 90" | 270" |
| Covering base paper | 15" | 30" | 240" |

FKW - Fluorocarbon compound, e.g., "Scotchban" (3M).

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. A water soluble depolymerized phosphated guar gum having a degree of substitution of about 0.1 to about 0.5 and a viscosity as a 2 weight percent solution in water of about 50 to about 4,000 mPa.s.

2. The composition of claim 1 wherein the degree of substitution is 0.1 to about 0.2.

3. A method for making water soluble phosphated guar comprising phosphating guar to a degree of substitution of about 0.1 to about 0.5 and depolymerizing the phosphated guar to render it water soluble wherein the phosphating step is conducted by reacting guar gum with an alkali metal phosphate in water at a pH of about 4.5 to about 8 and at a temperature of about 130° C. to about 180° C. and wherein the depolymerization reaction is conducted under alkaline conditions with an oxidizing agent at a temperature of about 70° C. to about 90° C.

4. The method of claim 3 wherein the phosphating reaction is conducted at a pH of about 5 to about 6.

5. The process of claim 3 wherein the phosphating step is first conducted followed by the depolymerizing step.

6. The process of claim 3 wherein the phosphating step is conducted on depolymerized guar.

7. The process of claim 3 wherein the phosphating step and the depolymerizing step are conducted simultaneously.

* * * * *